United States Patent Office 3,808,147
Patented Apr. 30, 1974

3,808,147
PRODUCTION OF AEROSOLS
John Dyment, Tadley, Leslie Boyne, Newbury, and Ian Dowen Thomason, Tadley, England, assignors to United Kingdom Atomic Energy Authority, London, England
Filed Aug. 23, 1971, Ser. No. 174,038
Claims priority, application Great Britain, May 28, 1971, 18,206/71
Int. Cl. B01d; C09k 3/30
U.S. Cl. 252—305                                   8 Claims

ABSTRACT OF THE DISCLOSURE

A method for producing an aerosol stream of an inorganic compound of an element comprises introducing a compound of the element such as sodium chloride, in solution or powder form, into a flammable gas stream, such as an oxyacetylene mixture, to form a suspension of the compound introduced thereto, the flammable stream having a flame temperature not less than the vaporizing temperature of the compound introduced, igniting the flammable stream whereby the suspended compound is vaporized and allowing the ignited stream to cool at least to the temperature at which the inorganic compound condenses therefrom to form the aerosol stream.

The aerosol stream has one application in the testing of air filters, the effluent flow from which can be photometrically analyzed. For the producing aerosols to be subjected to photometric analysis the compound introduced into the gas stream is a compound of a metal selected from the alkali metals, the alkaline earth metals and zinc.

BACKGROUND OF THE INVENTION

This invention relates to the production of aerosols and in particular to a method and apparatus for producing an aerosol stream of an inorganic compound, for example an aerosol stream of common salt, which aerosol stream has one application in the testing of high efficiency particulate air filters.

British Standard 3928: 1969 specifies a method of test for high efficiency air filters in which a test cloud or aerosol stream of common salt is generated by the evaporation of water from a spray of droplets formed by atomizing a salt solution in a spray-box. The relative humidity of the air stream in which the spray is entrained and the dimensions of the ducting through which the spray is conveyed to a filter under test are such that the water has evaporated by the time the test cloud reaches the filter leaving a cloud of small particles of salt. To achieve the dry aerosol stream the Standard stipulates that, for a fixed throughput of air, the ducting dimensions should be such that (i) the linear speed of the air stream does not exceed 30 ft./sec. and (ii) a residence time of at least 2 seconds elapses for the passages of the air between the atomizers and the filter, and further stipulates that the air delivered by a fan to the atomizers should be dry enough for the relative humidity of the salt-laden air at the filter face to be less than 60%. Apart from the need for humidity control of the inflowing air it will be apparent that for ducting of, for example, minimal diameter a duct length of at least 60 ft. is required and that such equipment is too bulky and unwieldy for ready transportation from one site to another for the in situ testing of filters. In addition bulky air compressor equipment is needed to operate the spray-box and provide the air stream.

After passing through the filter the air flows down effluent ducting within which is positioned an elbow bend sampling tube, the tube being connected to a flame photometer; any entrained salt particles produce a characteristic emission of sodium yellow light which sensitizes the cathode of a potomultiplier cell the resulting photocurrent being measured with a sensitive galvanometer: by prior calibration the galvanometer readings can be converted into percentage penetration figures. Atomizing a salt solution in the manner stipulated by the Standard produces an aerosol stream composed of particles mainly within the size range 0.02 $\mu$m. to 2.00 $\mu$m. diameter with a mass median size of 0.6 $\mu$m.

It is one object of the present invention to provide an improved method and apparatus for producing a salt aerosol stream which, in particular, is more suitable for the in situ testing of filters. The present invention will also produce particulate salt having a substantially smaller mass median diameter.

SUMMARY OF THE INVENTION

According to the present invention a method for producing an aerosol stream of an inorganic compound of an element comprises introducing a compound of the element, in solution or powder form into a flammable gas stream to form a suspension of the compound introduced thereto, the flammable stream having a flame temperature not less than the vaporizing temperature of the compound introduced, igniting the flammable stream whereby the suspended compound is vaporized and allowing the ignited stream to cool at least to the temperature at which the inorganic compound condenses therefrom to form the aerosol stream.

The compound introduced into the gas stream may be a heat- and flame-stable compound, i.e. an inorganic compound which on vaporizing and condensing in the stream yields the original compound, e.g. common salt. However, the compound introduced into the gas stream may, under the influence of the flame and flame temperature, condense as an inorganic compound chemically unrelated to the compound introduced e.g. $CaCl_2$ can be expected to condense as $CaO$. The compound introduced into the gas stream, in either of the above instances, will usually be a compound of a metal: it will be apparent that the compound in the second instance need not necessarily be an inorganic compound.

As already explained, the effluent flow in filter testing can conveniently, be photometrically analyzed. The flow can be analyzed by flame emission measurements or by flame absorption measurements. For flame emission measurements, the generally practiced method of measurement, suitable compounds for use in producing aerosols are those of the metals the inorganic compounds of which can be excited to yield strong spectral lives; one such compound, which is particularly suitable, being common salt. The suitable compounds—for flame absorption measurements as well as flame emission measurements—are those of the alkali and alkaline earth metals and, in particular, the halides of these metals, although for flame absorption measurements compounds, in particular the halides, of zinc may also be used.

A suitable flammable gas stream, for use in forming an aerosol stream of common salt, for example, comprises an oxyacetylene mixture: suitably the acetylene and oxygen in the mixture are mixed at pressures of about 0.6 and 0.7 kg./cm.$^2$ respectively.

Also according to the present invention apparatus for producing an aerosol stream of an inorganic compound of an element comprises a duct having a first inlet end thereof for admitting a stream of flammable gas into said duct, a second inlet located downstream of said first inlet for admitting a feed of a compound of the element, in solution or powder form, into said duct, an outlet orifice located at the other end of said duct adapted for ignition of the gas stream thereat without the duct, means for feeding the admitted compound into said duct through the second inlet at a constant rate and an enclosure within which said orifice is positionable, said enclosure having an outlet therefrom and being adapted such that the flammable gas stream on being ignited at said orifice is cooled therein and issues as an aerosol stream through said outlet.

The compound feeding means may feed the compound into said duct at a controllable constant rate.

When the feed is in powder form the compound feeding means may comprise a cylinder rotatable at constant speed within a housing said cylinder having a plurality of radial vanes extending therefrom which vanes are spaced equi-angularly and are a clearance fit in a bore in the housing, the housing having an upper inlet and a lower outlet for feeding compound to and from said rotatable cylinder. The speed at which the cylinder is rotatable may be controlled by, for example, using a variable speed electric motor to rotate the cylinder, in order to vary the feed rate.

Said enclosure outlet may be connected to extractor means, such as a fan, to facilitate extraction of the aerosol stream through said outlet and, preferably, said enclosure has an opening through which air can be drawn into said enclosure by said extractor means: the entry of a current of air into the enclosure promotes cooling of the ignited gas stream and hence promotes aerosol formation.

The first duct inlet may be connected to a gas mixing valve, said valve having an inlet for admitting a hydrocarbon gas e.g. acetylene, an inlet for admitting oxygen and an outlet feeding the flammable mixture of oxygen and hydrocarbon gas, mixed at the valve, into said duct inlet.

The second duct inlet may extend round the duct so that the compound is fed into the downstream flow of flammable gas from around the periphery of the duct. In addition it is preferred that the second inlet be angled relative to the axis of the duct to form a conical inlet such that the compound feeds into the duct in a direction having a component in the direction of downstream flow.

The outlet orifice may be a nozzle the bore size of which is less than that of the duct adjacent thereto, whereby the velocity of the gas stream is increased at the point of ignition, the reduction in bore size being such that the velocity of the stream becomes greater than the rate of flame propagation. Preferably the nozzle is made of heat-conducting material, e.g. copper to conduct heat away from the tip of the nozzle in contact with the gas flame thereby to lessen heat erosion of the tip.

A further aspect of the invention is the provision of a method for testing air filters comprising producing an aerosol stream as afordefined using a compound of a metal selected from the group consisting of the alkali metals, the alkaline earth metals and zinc e.g. common salt, directing the aerosol stream onto a filter under test and subjecting the effluent stream leaving the filter to flame photometric analysis wherewith to determine aerosol penetration of the filter.

BRIEF DESCRIPTION OF THE DRAWINGS

The nature of the present invention is hereafter further explained, by way of example, by reference to the accompanying drawings wherein:

FIG. 2 is a part-sectional view of apparatus including an extractor showing the apparatus coupled into filter ducting for in situ filter testing.

FIG. 3 shows plots comparing the particle size distribution of a flame-formed aerosol stream and an aqueous aerosol stream (produced according to B.S. 3928).

DESCRIPTION OF THE PREFERRED EMBODIMENT

Figure 1:
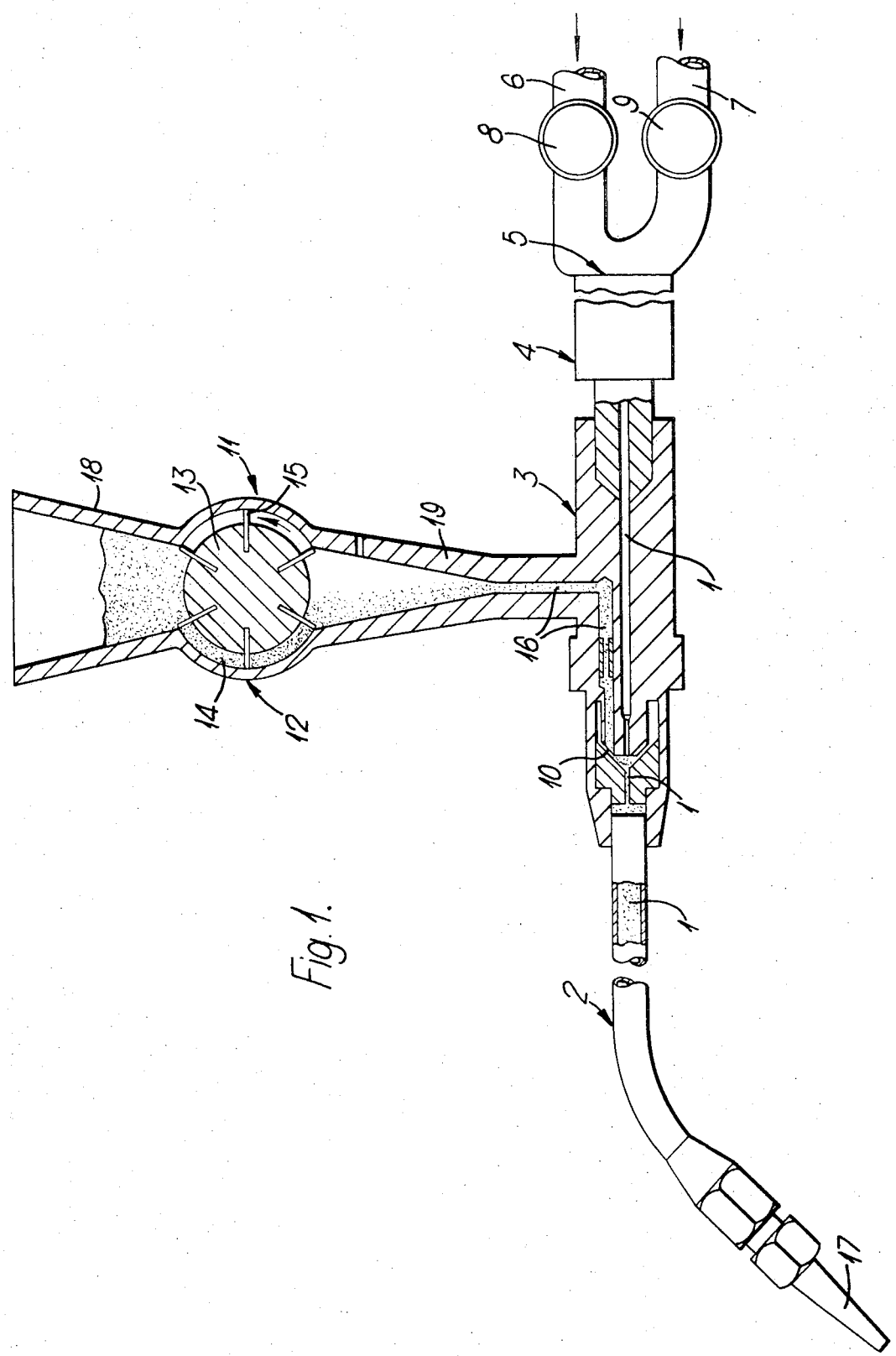
FIG. 1 is a fragmented view, partly in section, of one embodiment of apparatus excluding the enclosure in which the outlet orifice is positioned when producing an aerosol stream.

FIG. 1 is approximately to scale and shows a duct 1 of nonuniform cross-section which, for convenience in manufacture and assembly, is formed in separate components 2, 3 and 4 which are fitted together the joints therebetween being substantially gas-tight. At one end of the duct a stream of flammable gas enters through an inlet 5 the flammable gas being a mixture of oxygen, flowing through inlet 6, and acetylene, flowing through inlet 7: the flow of each gas is regulated by valves 8 and 9 which control the flow to give gas loading pressures of 0.7 and 0.6 kg./cm.$^2$ respectively against a gas mixing valve (not shown) connected to the inlet 5. Downstream the duct has a conical inlet 10 formed in component 3 through which a powder feed of common salt is admitted to the duct from a constant rate feed device 11. The device 11 comprises a housing 12 having a rotatable cylinder 13 located therein, the cylinder being journalled in walls of the housing and rotatable at constant speed by an electric motor—not shown—within a bore 14. Equi-size radially aligned vanes 15 spaced equi-angularly around the cylinder extend therefrom such that the vanes are a clearance fit in the bore 14. The housing 12 has an upper inlet 18 and a lower outlet 19 opening into the bore 14 through which common salt enters and leaves the device: for convenience in working the inlet 18 is in the form of a hopper and the outlet 19 is a closed chute directing the powder feed into ducting 16—part of component 3—whence it enters conical inlet 10. In order that the powder feed rate may be varied at will the electric motor is a variable speed motor. At the other end of the duct salt-laden flammable gas issues through an outlet orifice 17.

Dimensions for the apparatus of FIG. 1 are as follows:

Duct bore in component 2=7 mms. diam.
Duct bore at powder inlet in component 3=1½ mms. diam.
Duct bore in component 4=2mms. diam.

The duct diam. at the powder inlet is one of several parameters determining the rate of aerosol production (see below) and the duct size here can be varied by the use of exchangeable inserts of different size. After the powder feed has mixed in with the gas stream at the powder inlet the stream decelerates where it enters that part of the duct having a larger cross-sectional area. The cross-sectional area, and hence the magnitude of the deceleration, prepares the stream for issue at a suitable rate through orifice 17.

Figure 2:
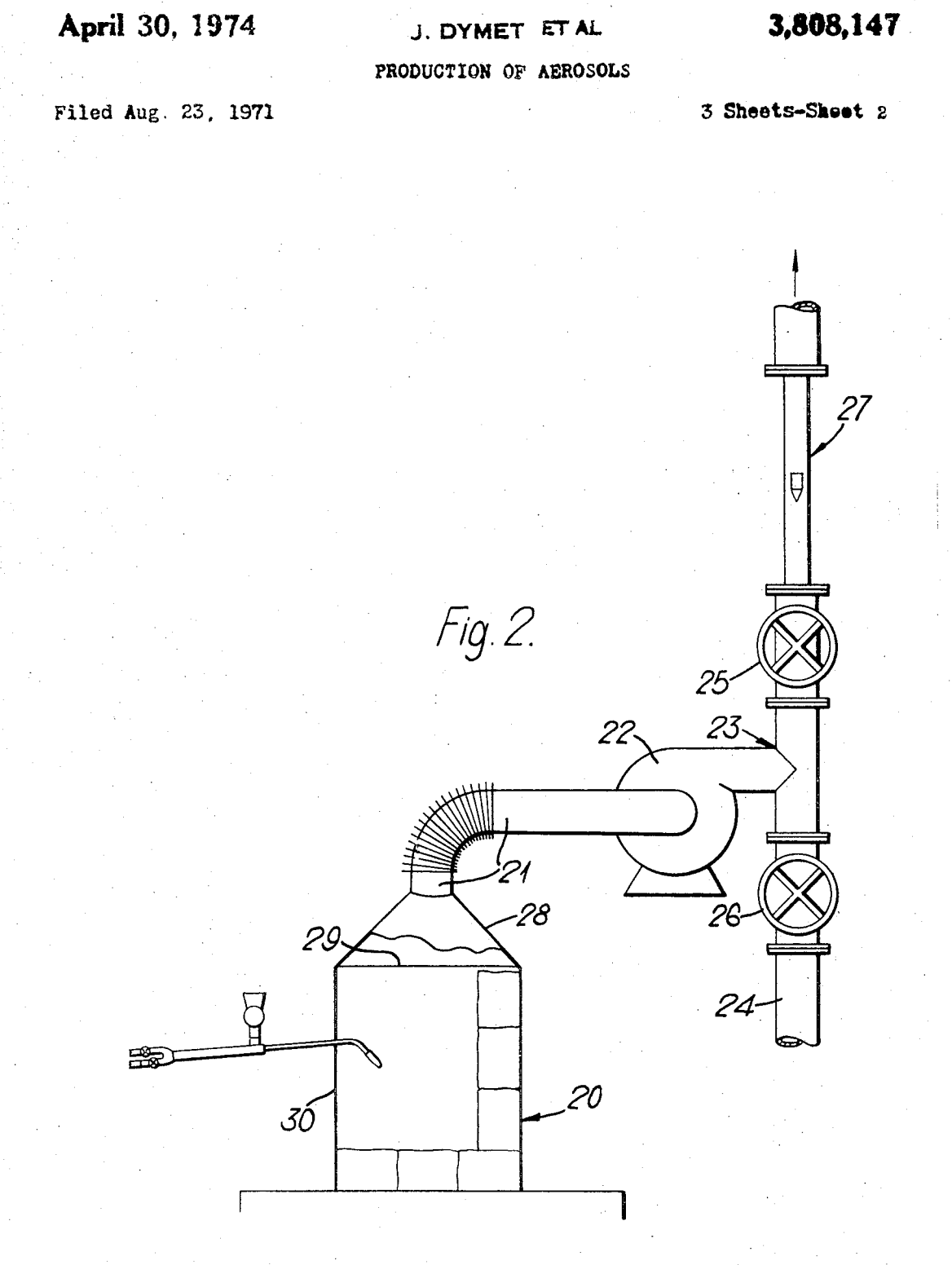

FIG. 2 is approximately to scale excepting for the apparatus of FIG. 1 included therein and shows the above-described apparatus assembly positioned with orifice 17 within an enclosure 20 the enclosure having an outlet 21 through which an aerosol stream issues after ignition of the flammable gas stream at the orifice 17. The outlet 21 is connected to an extractor 22, e.g. a fan, to provide a steady-rate aerosol stream issuing through the outlet which stream is then fed from the extractor through a T-shaped member 23 into ducting 24. The T-shaped member is shown fitted into the ducting but it can be removed therefrom by operation of isolating valves 25, 26 and, for normal working, is replaced with a short length of closed ducting.

The drawing also shows a flow-meter 27, positioned in ducting 24, for measuring the rate of flow in the installation. The enclosure 20 is a firebrick-lined casing, open at the front side 30, enabling the orifice 17 (FIG. 1) to be suitably positioned and allowing air to be sucked into the enclosure by the extractor 22. The casing has a conical hood 28, the outlet 21 being connected at the apex thereof. After ignition at the orifice 17 the flammable gas spreads out within the enclosure and cools. Cooling causes the vaporized salt to condense to submicron-sized particles and the conical hood 28 directs cooled salt-laden particulate gas into the outlet 21 through which it issues as a stream. A 1 cm. aperture steel mesh 29 extends across the base of the hood 28 to prevent ingress of combustible material into outlet 21. The outlet 21 of FIG. 2 has a bore diam. of 2 ins.

Figure 3:
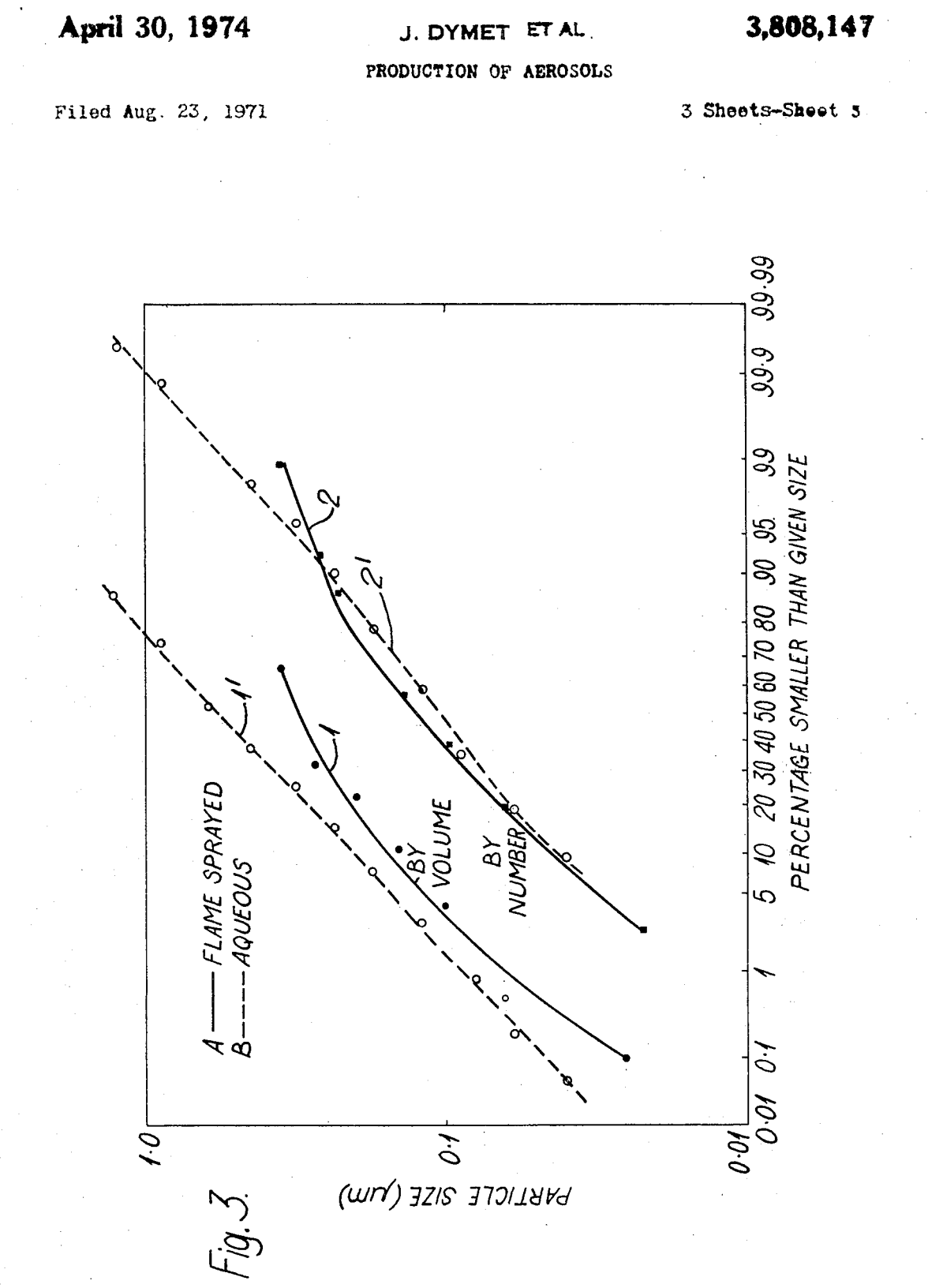

It has been found that a suitable flammable gas stream is provided by a mixture of acetylene and oxygen wherein the gases are mixed at pressures of 0.6 and 0.7 kg./cm.$^2$ respectively. For the aforedescribed apparatus embodiment a dense cloud (aerosol) of submicron particles is formed if powdered common salt is fed into the above gas stream at a rate of 5–10 gms. per minute. For operation at such feed rates it has been found that the submicron particles have a particle size substantially in the range 0.1 to 0.7 $\mu$m. In FIG. 3 a typical size distribution is compared with that obtained from an aqueous aerosol formed according to B.S. 3928: 1969. Curves 1, 2 give values for percentage by volume and percentage by number for a typical flame-formed aerosol and curves 1' and 2' percentages by volume and number respectively for an aqueous aerosol: the flame-formed aerosol had a mass median diam. of 0.34 $\mu$m. compared with 0.6 $\mu$m. for the aqueous aerosol.

In filter testing the test capacity of the above described apparatus depends on the aersol output and sensitively P, where P, expressed as a percent $$= \frac{\text{the minimum detectable conc}^n \text{ of salt downstream of a filter}}{\text{the concentration upstream of that filter}} \times 100$$

and is dependent on the responsiveness of the photometric analyzer.

$$P = 100 \frac{X}{S/Q}$$

where

X = min$^m$ concentration of salt detectably by photometer in gms./m.$^3$
Q = aerosol flow rate in m.$^3$/hr.
S = output of salt as aerosol in gms./hr.

hence, by way of example, for a sensitivity of 0.001%, an aerosol output of, say, 7 gms./min. and a detectable salt conc$^n$ of 0.02 $\mu$g./m.$^3$.

Q = 210,000 m.$^3$/hr.

A throughput of this order is adequate for conducting in situ testing of large multiple filter installations. For the present apparatus using various combinations of cylinder speed, orifice size and duct size—i.e. duct diam.—at the powder inlet the salt consumption rate was found to vary between 5.0 and 40.0 grams./min. For one orifice and duct combination the rate of aerosol production was found to vary in the range 6.6–6.9 gms./min. (measured by collecting on high efficiency filters) irrespective of the salt feed rate above the minimum rate required to attain that production rate: hence a substantially constant production rate was obtained for higher feed rates the surplus salt simply being deposited out of the gas stream. Hence provided a suitable choice of orifice and duct size is made such that salt deposition is minimal at higher feed rates the present apparatus is suitable for high rate aerosol production. The output of a Collison atomizer, specified for aerosol generation in B.S. 3928, is typically 0.2 gm./min.: hence at an output of 6.0 gms./min. the present apparatus gives a 30-fold increase in the rate of aerosol production.

Powdered common salt does not flow readily because of its crystalline and hygroscopic nature: to improve the flow the following treatment was devised. Each batch of 150 gms. of salt was mixed with 20 ml. of colloidal graphite and 30 ml. of absolute alcohol; the mixture was dispersed in a ballmill for 20 mins., dried under an infra-red lamp and stored at 120° C. until required: immediately prior to use it was passed through a 0.1 mm. aperture sieve. Using this powder any occasional "arching" in hopper 18 was readily overcome by agitation; and for this purpose it is convenient to attach a vibrator unit—not shown—to component 3: it is also prudent to cover hopper 18 e.g. with a perspex lid having a small hole, to minimize exposure of the treated salt to air. After prolonged operation e.g. 1–2 hrs. the flame shape can change due to deposits of salt at the orifice 17 and these deposits reduce aerosol output: the deposits can be removed by drawing a wire across the orifice.

In filter testing the above-described apparatus for producing a flame-formed aerosol stream is used in conjunction with a sodium flame detector unit positioned downstream of the apparatus, in relation to a filter installation. One suitable detector unit is the flame photometer disclosed in U.K. Pat. 1,128,625. Such a detector unit is coupled into filter ducting on the upstream side of a filter under test, to obtain a reading for the salt concentration in the as-produced aerosol stream, and is coupled into the down-stream side to obtain a reading for salt penetration. A quick-acting valve can be provided in gas lines to the flame photometer to effect a changeover in supply from the upstream to the down-stream side of the filter.

The apparatus of the present invention and the flame photometer of U.K. Pat. 1,128,625 can be mounted on separate trolleys which trolleys can be readily moved about from one location to another for the in situ testing of filters in a filter installation. Where a naked flame is not permitted the trolley carrying the aerosol-forming apparatus can be located in a remote position and the aerosol stream passed through temporary lightweight ducting to an aerosol inlet in the installation.

Although the embodiment described relates to a powder feed and is concerned with a device (11) for feeding powder at a constant and controllable rate the invention is not restricted to the use of a dry feed. A compound may be dissolved or suspended in a solution and a stream of the compound-laden solution may be fed into a flammable gas stream at a constant and controllable rate. On ignition of the flammable stream the solution rapidly boils off; it may abstract heat, as latent the of vaporization, from the ignited stream or add heat if it includes a combustible solvent. For example, a concentrated solution of brine can be used in lieu of the present dry powder feed.

We claim:

1. A method for producing an aerosol stream of an inorganic compound of an element comprising the following sequential steps: (i) introducing a compound of the element, in solution or powder form, into a flammable gas stream to form a suspension of the compound introduced thereto, the flammable stream having a flame temperature not less than the vaporizing temperature of the compound introduced, (ii) igniting the flammable stream whereby the suspended compound is vaporized and (iii) allowing the ignited stream to cool at least to the temperature at which the inorganic compound condenses therefrom to form the aerosol stream.

2. A method as claimed in claim 1 in which the compound introduced into the gas stream is an inorganic compound characterized by the feature that on vaporizing and condensing in the gas stream it yields the original compound.

3. A method as claimed in claim 1 in which the compound introduced into the gas stream is a compound of a metal selected from the group consisting of the alkali metals, the alkaline earth metals and zinc.

4. A method as claimed in claim 3 in which the compound is a halide.

5. A method as claimed in claim 2 in which the compound is common salt.

6. A method as claimed in claim 5 in which the flammable gas stream is an oxyacetylene mixture.

7. A method as claimed in claim 6 in which acetylene and oxygen in the mixture are mixed at pressures of about 0.6 and 0.7 kg./cm.$^2$ respectively.

8. A method as claimed in claim 2 wherein the compound-laden gas stream is caused to issue from a constricting orifice prior to ignition, said orifice being of a size such that the velocity of the stream issuing therefrom exceeds the rate of flame propagation.

References Cited
UNITED STATES PATENTS

| 2,836,567 | 5/1958 | Reure et al. | 252—359 CG |
| 3,047,057 | 7/1962 | Carlyle | 252—359 CG |

JOHN D. WELSH, Primary Examiner

U.S. Cl. X.R.

252—359